US011841002B2

(12) United States Patent
Biris et al.

(10) Patent No.: US 11,841,002 B2
(45) Date of Patent: Dec. 12, 2023

(54) MONITORING A WIND TURBINE BASED ON A PREDICTED FUTURE THERMAL CONDITION OF A WIND TURBINE ELECTRICAL COMPONENT

(71) Applicant: VESTAS WIND SYSTEMS A/S, Aarhus N. (DK)

(72) Inventors: Ciprian Biris, Hadsten (DK); Ole Damm Kristensen, Åbyhøj (DK); Shirin Yousefizadeh, Aalborg Øst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/081,411

(22) Filed: Dec. 14, 2022

(65) Prior Publication Data
US 2023/0184224 A1 Jun. 15, 2023

(30) Foreign Application Priority Data

Dec. 14, 2021 (DK) .............. PA 2021 70619

(51) Int. Cl.
*F03D 17/00* (2016.01)
*F03D 13/20* (2016.01)

(52) U.S. Cl.
CPC ............. *F03D 17/00* (2016.05); *F03D 13/20* (2016.05); *F05B 2260/821* (2013.01); *F05B 2260/84* (2013.01); *F05B 2270/303* (2013.01)

(58) Field of Classification Search
None
See application file for complete search history.

(56) References Cited

U.S. PATENT DOCUMENTS

| 8,249,852 | B2 * | 8/2012 | Thulke ............... G05B 23/0254 |
| | | | 290/44 |
| 8,977,401 | B2 * | 3/2015 | Poulsen ................. F03D 7/044 |
| | | | 290/55 |
| 10,151,301 | B2 | 12/2018 | Caponetti et al. |
| 11,098,694 | B2 * | 8/2021 | Andersen ............... F03D 17/00 |

(Continued)

FOREIGN PATENT DOCUMENTS

| CN | 111293671 A | 6/2020 |
| EP | 3522360 A1 | 8/2019 |

(Continued)

OTHER PUBLICATIONS

Danish Patent Office, Search Report for Danish Patent Application No. PA 2021 70619, dated Aug. 1, 2022.

(Continued)

*Primary Examiner* — Juan G Flores
(74) *Attorney, Agent, or Firm* — Patterson + Sheridan, LLP

(57) ABSTRACT

Method and apparatus for monitoring a wind turbine having an electrical component. An exterior temperature and power loss associated with the electrical component is obtained, and a thermal model describing the electrical component is executed, based on the exterior temperature and power loss, to determine an internal temperature of the electrical component. A further thermal model describing the electrical component is executed, based on the internal temperature and an exterior component temperature, to predict a future thermal condition of the electrical component in order to monitor operation of the wind turbine.

20 Claims, 6 Drawing Sheets

(56) References Cited

U.S. PATENT DOCUMENTS

| | | | | |
|---|---|---|---|---|
| 2010/0270798 A1* | 10/2010 | Poulsen | ............... | H02P 9/14 |
| | | | | 290/44 |
| 2012/0029892 A1* | 2/2012 | Thulke | ............... | F03D 7/045 |
| | | | | 703/7 |
| 2019/0195198 A1* | 6/2019 | Andersen | ............ | F03D 7/0272 |
| 2020/0392942 A1 | 12/2020 | Andersen et al. | | |
| 2021/0075334 A1 | 3/2021 | Stark | | |
| 2021/0388815 A1* | 12/2021 | Nyvad | ............... | F03D 7/048 |

FOREIGN PATENT DOCUMENTS

| | | | | | |
|---|---|---|---|---|---|
| EP | 3840213 | A1 | 6/2021 | | |
| EP | 4056839 | A1 | 9/2022 | | |
| WO | 2021155657 | A1 | 8/2021 | | |
| WO | WO-2021155657 | A1 * | 8/2021 | ......... | G01R 31/2601 |
| WO | 2021244722 | A1 | 12/2021 | | |

OTHER PUBLICATIONS

European Patent Office, Extended European Search Report for Application 22213357.1-1002 dated May 17, 2023.

\* cited by examiner

MONITORING A WIND TURBINE BASED ON A PREDICTED FUTURE THERMAL CONDITION OF A WIND TURBINE ELECTRICAL COMPONENT

TECHNICAL FIELD

The invention relates to monitoring a wind turbine having an electrical component and, in particular, to monitoring operation of the wind turbine based on a predicted thermal condition of the electrical component. A control action to control operation of the wind turbine may be performed based on the predicted thermal condition.

BACKGROUND

A wind turbine generator converts energy contained in wind into electrical power, which is typically delivered to a power grid. As the changeable nature of wind entails an electrical power output of varying characteristics, a power converter is also included to modify the variable frequency electrical power produced by the generator into a fixed frequency electrical power output that is more suitable for delivery to a power grid.

The converter may include electrical components that heat up during operation. For instance, one such component may include a chopper resistor of the converter, which monitors DC link voltage to convert excess energy in a DC link of the converter into thermal energy.

A wind turbine may be configured to shut down if a surface temperature of the chopper resistor reaches a threshold value, i.e. if the chopper resistor overheats, in order to guard against component failure or safety risks, e.g. a fire hazard, resulting from this temperature increase. However, the surface temperature of a chopper resistor may continue to increase after the electrical circuit is tripped to shut down wind turbine operation, such that risks relating to component failure or safety remain after shut down.

It is against this background to which the present invention is set.

SUMMARY OF THE INVENTION

According to an aspect of the present invention there is provided a method of monitoring a wind turbine having an electrical component. The method comprises obtaining a first exterior temperature associated with the electrical component, and obtaining a power loss of the electrical component at current operating variables. The method includes executing a first thermal model describing the electrical component to determine at least one internal temperature of the electrical component, the first thermal model being executed based on the obtained first exterior temperature and the obtained power loss. The method includes obtaining a second exterior temperature associated with the electrical component, and executing a second thermal model describing the electrical component to predict a future thermal condition of the electrical component to monitor operation of the wind turbine, the second thermal model being executed based on the determined at least one internal temperature and the obtained second exterior temperature.

The second thermal model may be executed based on zero power loss of the electrical component.

At least one computing device may implement the method in an iterative manner. The first thermal model may be executed at a first iteration rate to provide the determined at least one internal temperature at time intervals of a first interval length. The second thermal model may be executed at a second iteration rate to provide the predicted future thermal condition at time intervals of a second interval length. The second interval length may be any suitable length different from the first interval length.

The second interval length may be greater than the first interval length. Optionally, the second interval length is at least one order of magnitude greater than the first interval length.

The second iteration rate may be greater than the first iteration rate.

The method may include outputting a control action for controlling operation of the wind turbine based on the future thermal condition.

The control action may include causing operation of the wind turbine to shut down (a trip signal to be sent). The control action may include causing the wind turbine to switch to a different operational mode. Optionally, the different operational mode may be a derated operational mode or the different operational mode may include overloading the electrical component.

The electrical component may include a chopper resistor of a power converter of the wind turbine.

The at least one internal temperature may include a temperature of a resistive element of the electrical component, e.g. a wire temperature of the electrical component where the electrical component is a chopper resistor.

The at least one internal temperature may include one or more internal circuit temperatures of the electrical component.

The future thermal condition may include a future surface temperature of the electrical component at a defined time ahead of a current time.

The future thermal condition may include a predicted time period until the surface temperature of the electrical component reaches a prescribed threshold temperature.

The first thermal model may be a first Cauer model. The second thermal model may be a second Cauer model.

The first exterior temperature may be ambient (air) temperature. The first exterior temperature may be a surface temperature of the electrical component.

The second exterior temperature may be ambient temperature. Optionally, the first and second exterior temperatures may be the same.

According to another aspect of the invention there is provided a non-transitory, computer-readable storage medium storing instructions thereon that when executed by one or more processors cause the one or more processors to execute the method defined above.

According to another aspect of the invention there is provided a controller for controlling a wind turbine having an electrical component. The controller is configured to obtain a first exterior temperature associated with the electrical component, and obtain a power loss of the electrical component at current operating variables. The controller is configured to execute a first thermal model describing the electrical component to determine at least one internal temperature of the electrical component, the first thermal model being executed based on the obtained first exterior temperature and the obtained power loss. The controller is configured to obtain a second exterior temperature associated with the electrical component, and to execute a second thermal model describing the electrical component to predict a future thermal condition of the electrical component, the second thermal model being executed based on the determined at least one internal temperature and the obtained second exterior temperature. The controller may be configured to output a control action for controlling operation of the wind turbine based on the future thermal condition.

According to another aspect of the invention there is provided a wind turbine comprising a controller as defined above.

BRIEF DESCRIPTION OF THE DRAWINGS

Examples of the invention will now be described with reference to the accompanying drawings, in which:

FIG. 5(a) shows a plot of predicted future surface temperature of the chopper resistor across a future time period; and, FIG. 5(b) shows a plot of a predicted time for the surface temperature to reach a prescribed value; and, FIG. 6 summarises the steps of a method performed by the controller of FIG. 2 in accordance with an example of the invention.

DETAILED DESCRIPTION

Figure 1:
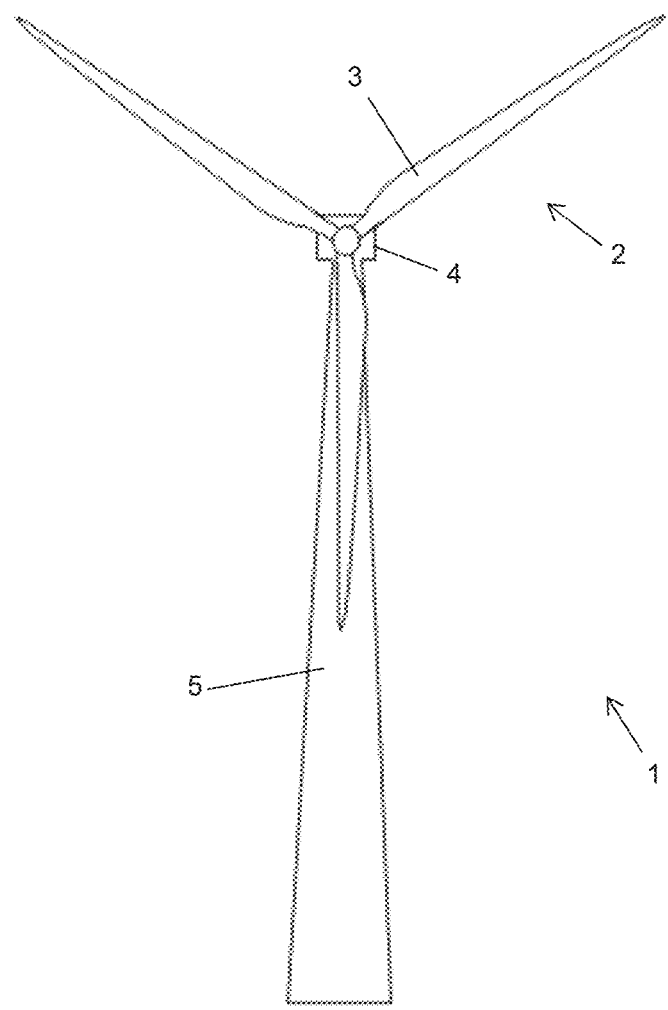
FIG. 1 is a schematic view of a wind turbine in accordance with an example of the invention.

FIG. 1 shows an individual wind turbine generator 1 (or, simply, wind turbine 1) of a kind that may be controlled according to examples of the invention. It will be appreciated that the wind turbine generator 1 of FIG. 1 is referred to here by way of example only, and it would be possible to implement examples of the invention into different types of wind turbine systems.

The wind turbine generator 1 shown is a three-bladed upwind horizontal-axis wind turbine (HAWT), which is the most common type of turbine in use. The wind turbine generator 1 comprises a turbine rotor 2 having three blades 3, the rotor 2 being supported at the front of a nacelle 4 in the usual way. It is noted that although three blades is common, different numbers of blades may be used in alternative examples. The nacelle 4 is in turn mounted at the top of a support tower 5, which is secured to a foundation (not shown) that is embedded in the ground. In different examples, the tower may be supported on a floating platform, e.g. in the case of an off-shore installation.

The nacelle 4 contains a generator (not shown in FIG. 1) that is driven by the rotor 2 to produce electrical energy. Thus, the wind turbine generator 1 is able to generate power from a flow of wind passing through the swept area of the rotor 2 causing the rotation of the blades 3.

Figure 2:
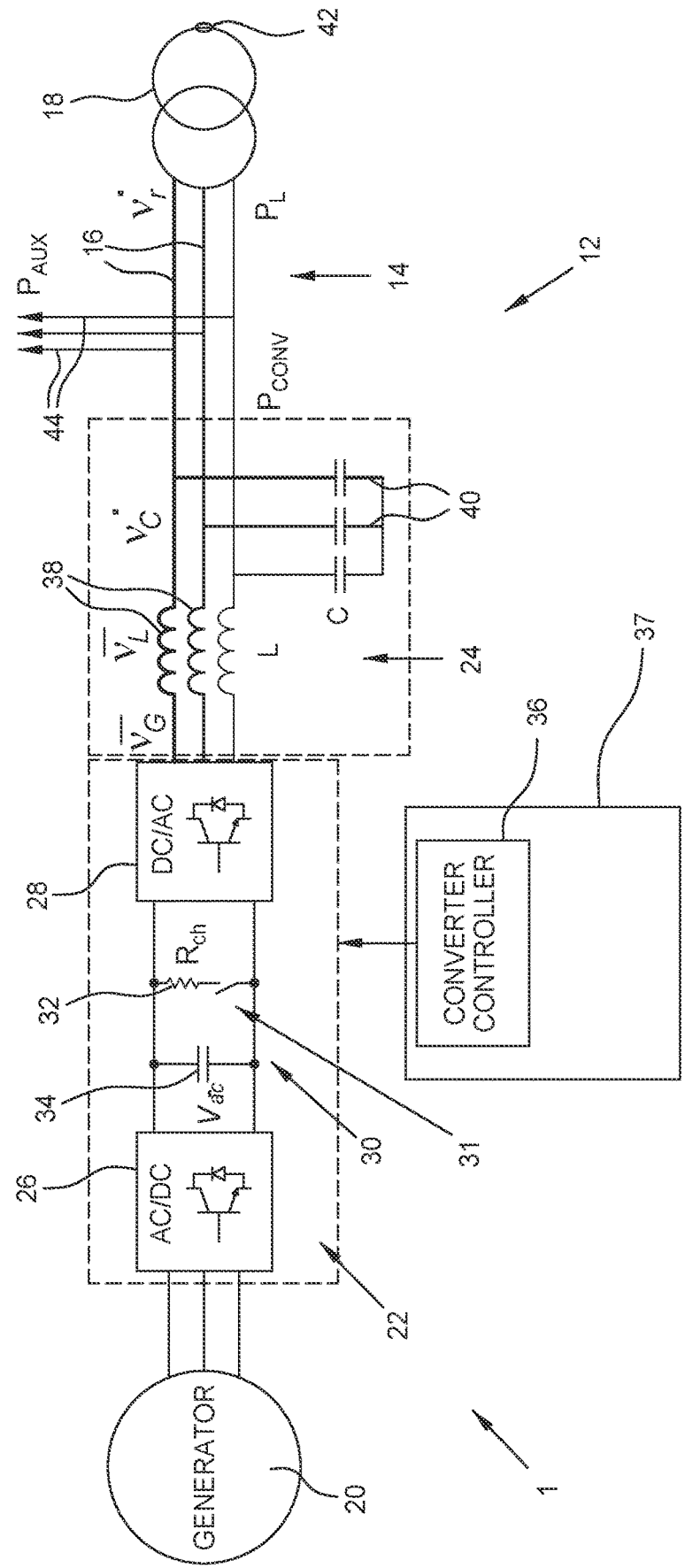
FIG. 2 is a schematic view of a full-scale converter architecture of the wind turbine of FIG. 1, including a controller for controlling the wind turbine of FIG. 1.

With reference now to FIG. 2, an example of a wind power plant 12 to which methods according to examples of the invention may be applied is shown. The example shown is based on a full-scale converter architecture. The components of the wind power plant 12 are conventional and as such familiar to the skilled reader, and so will only be described in overview.

The wind power plant 12 shown in FIG. 2 includes a single wind turbine generator 1 such as that shown in FIG. 1, but in practice further wind turbine generators may be included.

As already noted, the wind turbine generator 1 comprises an electrical generator 20 that is driven by a rotor (not shown in FIG. 2) to produce electrical power. The wind turbine generator 1 includes a low voltage link 14 defined by a bundle of low voltage lines 16 terminating at a coupling transformer 18, which acts as a terminal that connects the wind turbine generator 1 to a grid transmission line that in turn connects to a power grid. Electrical power produced by the wind turbine generator 1 is delivered to the grid through the coupling transformer 18.

The power produced in the electrical generator 20 is three-phase AC, but is not in a form suitable for delivery to the grid, in particular because it is typically not at the correct frequency or phase angle. Accordingly, the wind turbine generator 1 includes a power converter 22 and a filter 24 disposed between the electrical generator 20 and the coupling transformer 18 to process the electrical generator 20 output into a suitable waveform having the same frequency as the grid and the appropriate phase angle.

The power converter 22 provides AC to AC conversion by feeding electrical current through an AC-DC converter 26 followed by a DC-AC converter 28 in series. The AC-DC converter 26 is connected to the DC-AC converter 28 by a conventional DC link 30, which includes a switch 31 in series with a resistor 32 (which will be described in greater detail below) to act as a dump load to enable excess energy to be discharged, and a capacitor 34 providing smoothing for the DC output.

Any suitable power converter 22 may be used. In this embodiment, the AC-DC and DC-AC parts of the power converter 22 are defined by respective bridges of switching devices (not shown), for example in the configuration of a conventional two level back-to-back converter. Suitable switching devices for this purpose include integrated gate bipolar transistors (IGBTs) or metal-oxide-semiconductor field-effect transistors (MOSFETs). The switching devices are typically operated using pulse-width modulated drive signals.

The smoothed DC output of the AC-DC converter 26 is received as a DC input by the DC-AC converter 28 and creates a three-phase AC output for delivery to the coupling transformer 18.

As noted above, in a full-scale architecture the DC-AC converter 28 is configured to provide a level of control over the characteristics of the AC power produced, for example to increase the relative reactive power in dependence on grid demand. Noting that the magnitude, angle, and frequency of the output is dictated by grid requirements, and that the voltage is set at a constant level in accordance with the specifications of the low voltage link 14, in practice only the current of the AC output is controlled, and a converter controller 36 is provided for this purpose. The converter controller 36 forms part of an overall control system or overall controller 37 that controls operation of the wind power plant 12.

The overall control system or controller 37 may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the methods.

The control system 37 acts based on sample data obtained by a sampling system that probes the wind turbine generator 1 at various stages to sample electrical signals that are indicative of current and/or voltage, for example. In particular, as is typical for a full-scale architecture, the sampling system gathers raw data relating to the current and voltage of the outputs from the stator of the generator 20, and from the power converter 22 on the grid side. This raw data is processed into sample data, which is then passed to the controller 37, for example. The converter controller 37 uses the sample data to determine operating parameters for the wind turbine generator 1. For example, the duty cycle of the control signals for generator-side IGBTs of the power converter 22 may be determined, at least in part, based on the instantaneous properties of the generated power supplied by the electrical generator 20.

The AC output leaves the power converter 22 through the three power lines 16, one carrying each phase, which together define the low voltage link 14. The low voltage link 14 includes the filter 24, which in this example comprises a respective inductor 38 with a respective shunted filter capacitor 40 for each of the three power lines 16, to provide low-pass filtering for removing switching harmonics from the AC waveform.

The three power lines 16 may also each include a respective circuit breaker (not shown) for managing faults within the wind power plant 12.

As noted above, the low voltage link 14 terminates at the coupling transformer 18, which provides a required step-up in voltage. A high voltage output from the coupling transformer 18 defines a wind turbine generator terminal 42, which acts as a point of common coupling for the wind power plant 12.

The low voltage link 14 also includes three branches, one for each phase, that define auxiliary power lines 44 that divert some of the power that is output from the filter 24 for powering auxiliary systems of the wind power plant 12 such as, for example, yaw, pitch, and cooling systems.

Returning to the DC link 30, this may be regarded as a chopper circuit where the resistor 32 may be referred to as a chopper resistor. This DC to DC converter changes fixed DC power to variable DC power, so that supplied DC power may be adjusted to a required amount. In particular, the output voltage of the chopper circuit may be controlled by opening and closing the switch 31, i.e. by changing the switch 31 between on and off states. When the switch is in an off state (open circuit), the voltage provided to the DC-AC converter 28 is the source or input voltage, and when the switch is in an on state (short circuit), the provided voltage is zero. In this way, changing the switch between on and off states 'chops' the voltage provided by the DC link.

The chopper circuit may be switched on when power is to be provided to the grid as the power to be provided needs to be controlled. The chopper circuit may heat up when it is switched on and, in particular, the chopper resistor 32 may heat up as it acts as a dump load for excess energy. The chopper circuit needs to be monitored for overheating. If the chopper temperature increases above a certain value then it can cause damage, to itself and to nearby components. There is also a risk of fire associated with overheating of such an electrical component, which presents a safety risk in addition to the risk of component (and inverter or turbine) failure.

The temperature of an electrical component such as the chopper 30 may therefore be monitored to detect when overheating may occur. It can be difficult to measure, or otherwise monitor, the temperature of an internal part of an electrical component, e.g. the wire of the chopper resistor 32, as it may be very hot and/or have a high voltage. Typically, the temperature of a surface of the electrical component, e.g. a case temperature, may therefore be measured. When the surface temperature reaches or exceeds a certain value then a control action may need to be taken to mitigate the risk of component failure or fire. For instance, the wind turbine may be shut down (i.e. tripped) to achieve this.

The maximum permitted or allowed temperature at the surface of the chopper (to guard against the above safety or operational issues) is lower than that of the (internal) wire of the chopper. For instance, the maximum allowed (case) temperature at the chopper surface may be around 200 degrees Celsius, and the maximum allowed wire temperature may be around 1000 degrees Celsius.

An issue arises in that even if the wind turbine 10 is tripped when the measured surface temperature reaches the threshold surface temperature, the surface temperature will continue to rise for a period thereafter. This is because the wire temperature will likely be higher than the surface temperature and because of the high thermal inertia of the electrical component (high time constant), such that heat from the core of the electrical component (e.g. chopper resistor) will continue to propagate towards its surface even after the turbine is tripped. This further rise in surface temperature beyond the maximum allowable value therefore means that the electrical component continues to pose a safety or operational rise despite wind turbine shutdown.

The present invention is advantageous in that it allows for a prediction of a future thermal condition of an electrical component, such as a chopper circuit/resistor, to be made. This future thermal condition can be used to determine an appropriate control action to be taken to prevent overheating of the electrical component, thus guarding against component failure/damage or safety risks, such as fire.

The invention achieves these advantages by using two separate thermal models or functions, e.g. Cauer models or functions, each describing the electrical component (in particular, modelling the physical thermodynamic properties of the component): a first thermal model for estimating or determining one or more internal temperatures associated with the electrical component (e.g. wire temperature); and, a second thermal model that uses the output from the first thermal model to determine or predict a future thermal condition associated with the electrical component, in particular the surface of the electrical component. The future thermal condition may for instance include predicted surface temperature of the electrical component a prescribed time period in the future and/or a predicted time for the surface temperature to reach a prescribed value, e.g. the maximum allowable surface temperature. This will be described in greater detail below.

As is known in the art, a Cauer thermal model—or, simply, Cauer model—describes or models heat transfer through multiple layers of a physical component, e.g. a semiconductor device. In particular, a Cauer model includes a plurality of Cauer thermal model element components representing different parts of the electrical component. The Cauer model is a unified model for heating and cooling.

Figure 3:
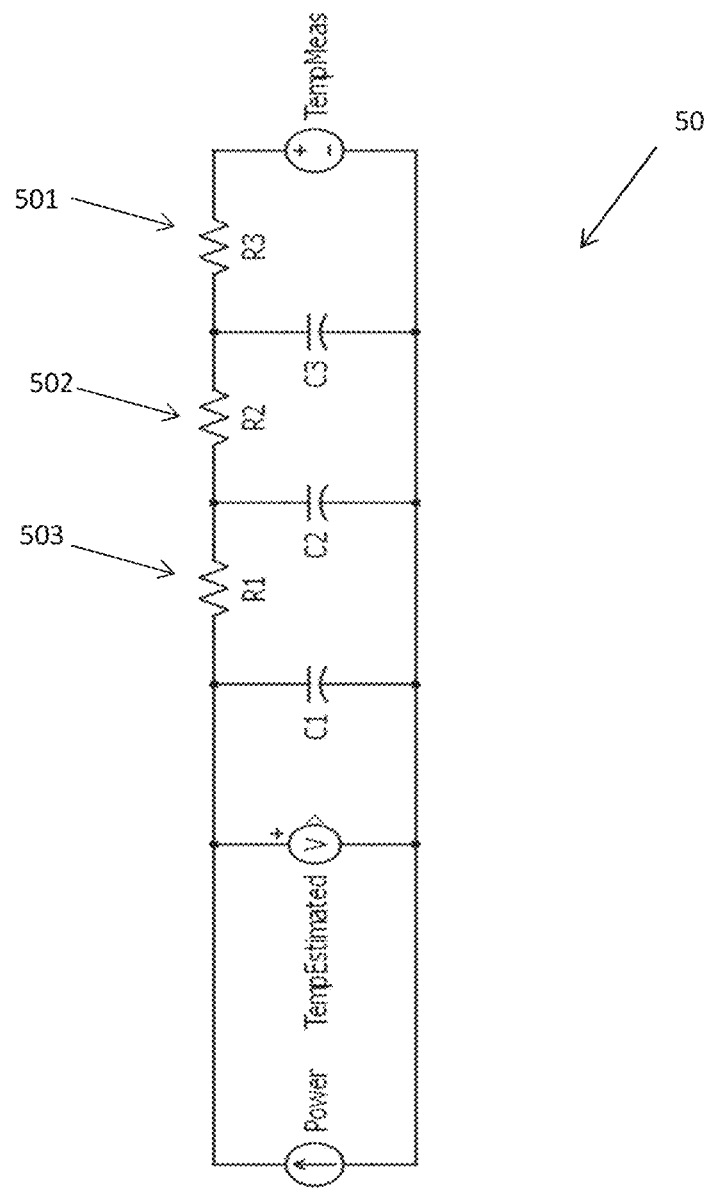
FIG. 3 is a schematic view of an example of a Cauer network description of an electrical component of the wind turbine of FIG. 1.

FIG. 3 schematically illustrates an example of a Cauer network description of the chopper resistor 32 of the wind turbine 10. The Cauer model 50 has a number of nodes, where each parameter or node has a physical interpretation. This allows access to the temperatures of the internal layers of the chopper resistor 32. The number of layers/nodes to be used may be chosen, where a higher number of layers provides increased precision in the model calculations or estimations, but also has increased processing or computation cost. Model reduction may be used to reduce the number of layers by combining less dominant terms for the inner materials of the chopper resistor 32, for instance. In the example illustrated in FIG. 3, three layers or nodes 501, 502, 503 are provided for the inner materials (i.e. a network of size 3).

The Cauer model 50 takes a measured temperature 504 as an input. This may be a measured surface/case temperature of the chopper resistor 32 or an ambient temperature, for instance obtained via an appropriate sensor. The Cauer model 50 also takes the power as an input, i.e. the power burned in the chopper (chopper power loss), which may be obtained by sampling the current and (DC) voltage, or simply by using the DC voltage and the duty cycle. The output of the Cauer model 50 is then an estimated temperature of the (internal) part of the chopper resistor 32 that is of interest, e.g. the temperature of the resistive element (such as the wire). The network parameters, e.g. R1-R3, may be obtained as lookup values, e.g. from a datasheet or database, or may be obtained by suitable optimisation techniques or by calculations from physical parameters.

In the described example, and as mentioned above, in order to predict a future thermal condition of the chopper resistor 32, two (reduced) Cauer models are used. The first of these estimates one or more (current) internal chopper resistor temperatures, and these are used by the second model to predict the future thermal condition.

Figure 4:
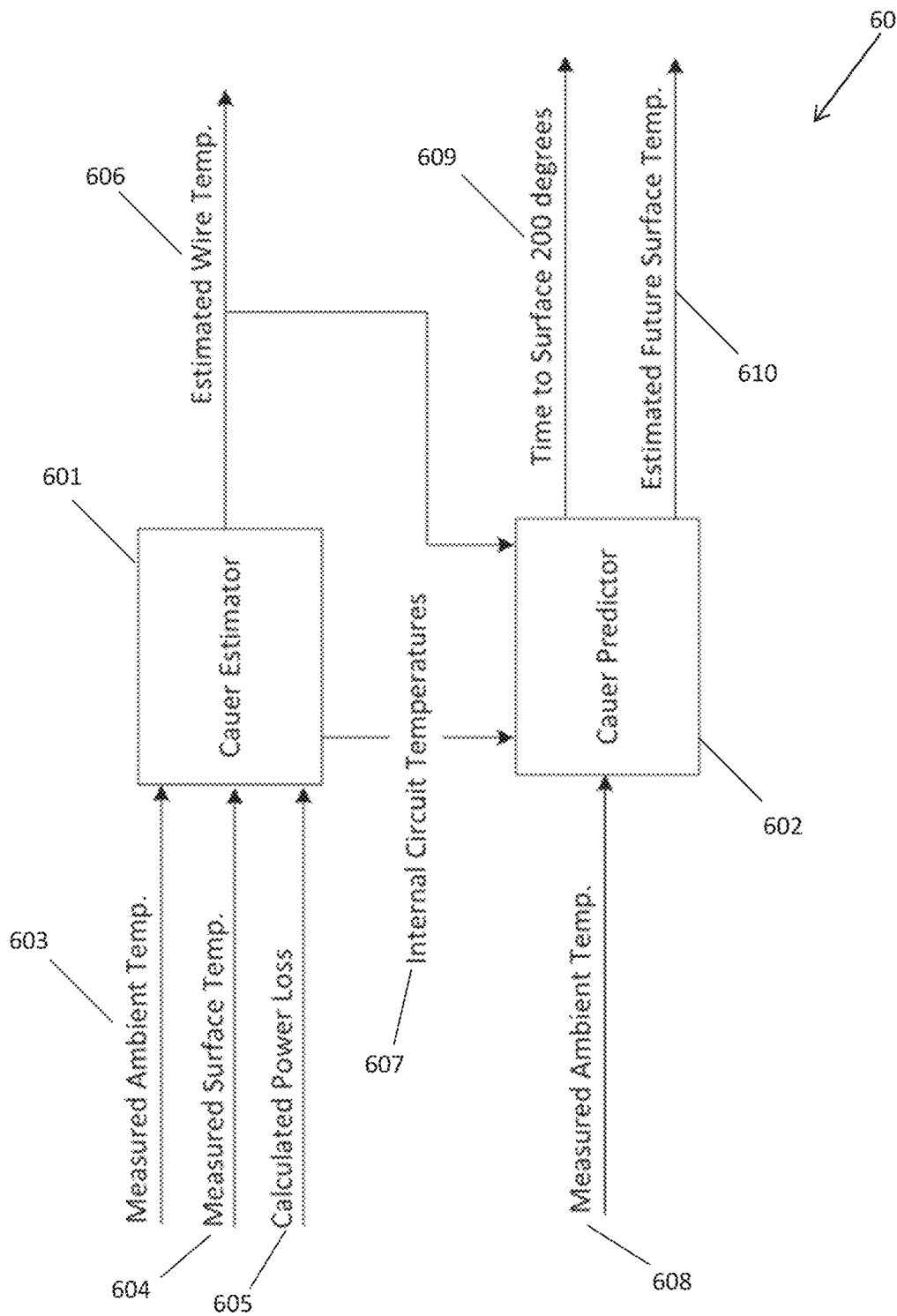
FIG. 4 illustrates a module architecture implemented in the controller of FIG. 2 for predicting a future thermal condition of a chopper resistor of the converter architecture of FIG. 2.

FIG. 4 illustrates a module architecture 60 implemented in the overall controller 37 of the wind turbine 10 for determining the future thermal condition of the chopper resistor 32. The architecture 60 includes a first thermal model 601, which in the described example is a Cauer model, referred to as the Cauer estimator 601, that describes the chopper resistor 32. The Cauer estimator determines current values of one or more internal temperatures of the chopper resistor 32 when the wind turbine 10 is operating, i.e. there is non-zero power dissipation across the chopper. The architecture 60 also includes a second thermal model 602, which in the described example is also a Cauer model, referred to as the Cauer predictor 602, that describes the chopper resistor 32. The Cauer predictor 602 uses the current internal temperature(s) determined by the Cauer estimator 601 to determine the future thermal condition.

The Cauer estimator 601 operates as described with reference to the Cauer model 50 of FIG. 3. In particular, the Cauer estimator 601 receives or otherwise obtains an exterior temperature associated with the chopper resistor 32, i.e. a temperature exterior to the chopper resistor 32. This may be a measured value from an appropriate sensor of the wind turbine 10. The exterior temperature may be an ambient temperature external to the chopper resistor 32. For instance, the ambient temperature may be a measurable temperature nearest to the chopper resistor 32. That is, the ambient temperature may be the temperature of an area surrounding the chopper so far as it is reasonably practicable to measure. This may include, for example, the ambient air temperature. The exterior temperature may be a surface temperature of the chopper resistor, also referred to as a case temperature.

In the example illustrated in FIG. 4, the Cauer estimator 601 receives both a measured ambient air temperature 603 and a measured chopper surface temperature 604. In different examples, only one of these measurements may be provided to the Cauer estimator. In a specific example, the measured surface temperature—e.g. obtained from a surface sensor— is used as the exterior temperature in the Cauer estimator (as this may increase the accuracy of the estimation).

The Cauer estimator 601 also takes an indication of power loss 605 of the chopper at current operating variables of the wind turbine 10. For instance, the power loss 605 may be calculated based on sampled (DC) voltage measurement and the duty cycle associated with chopper operation.

The Cauer estimator 601 executes the Cauer model to determine at least one internal temperature of the chopper resistor 32 based on the exterior temperature, e.g. measured surface temperature, and the power loss of the resistor 32. In the example illustrated in FIG. 4, the Cauer estimator 601 outputs an estimated wire temperature 606, i.e. the estimated temperature of the wire of the chopper resistor 32. The controller 37 may take one or more control actions based on the estimated (current) resistive element temperature 606. For instance, if this estimated temperature 606 reaches a certain value, such as a maximum permitted/allowable temperature for the resistive element (e.g. about 1000 degrees Celsius), then the wind turbine 10 may be shut down to prevent failure of the chopper resistor 32 or an associated component.

In the described example, the Cauer estimator 601 also outputs one or more internal circuit temperatures 607 of the chopper resistor 32. These internal circuit temperatures 607 may correspond to the estimated temperature at one or more layers/nodes of the Cauer model describing the chopper resistor 32. In one example, the Cauer estimator 601 has five layers, and the internal circuit temperatures 607 may include the temperature at one or more of these layers.

In the described example, the Cauer predictor 602 operates under an assumption of zero power loss or dissipation across the chopper resistor 32. That is, the Cauer predictor 602 determines or estimates a thermal profile or condition of the chopper resistor 32 under an assumption that the wind turbine 10 has been shut down or tripped. In particular, the Cauer predictor 602 predicts the thermal profile of the chopper resistor 32 over a future time period under the assumption that the wind turbine 10 is shut down at the current time.

As such, the Cauer predictor 602 takes as an input the (current) estimated internal temperatures determined by the Cauer estimator 601. In particular, in the described example the Cauer predictor 602 receives the estimated wire temperature 606 and the internal circuit temperature(s) 607; however, in different examples only one if these may be used by the Cauer predictor 602.

The Cauer predictor 602 further takes an obtained exterior temperature 608 of the chopper resistor 32 as an input. In the example illustrated in FIG. 4, the obtained exterior temperature is an ambient temperature 608. The exterior temperatures obtained by the respective thermal model modules 601, 602 may therefore be the same, e.g. ambient temperature, or may be different. In one specific example, the exterior temperature received by the Cauer estimator 601 is measured surface temperature 604 and the exterior temperature received by the Cauer predictor 602 is measured ambient temperature 608.

The Cauer predictor 602 executes the Cauer model to determine at least one future thermal condition of the chopper resistor 32 based on the estimated (internal) temperature(s) 606, 607 from the Cauer estimator 601, and the measured ambient temperature 608. In the example illustrated in FIG. 4, the Cauer predictor 602 outputs a future thermal condition in the form of a predicted time period 609 until the surface temperature of the chopper resistor 32 reaches a prescribed threshold value (within a specified time period into the future). In the present example, the prescribed threshold value is the maximum allowable surface temperature, e.g. about 200 degrees Celsius, or any other suitable value. Also in the example illustrated in FIG. 4, the Cauer predictor 602 outputs a future thermal condition in the form of a predicted maximum surface temperature 610 within a prescribed time period into the future. One or both of these outputs 609, 610 may be used by the controller 37 to determine and transmit a control action to control the wind turbine 10 to prevent overheating of the chopper resistor 32.

The computational implementation of the Cauer models 601, 602 will now be described in greater detail. As mentioned above, the controller 37 implementing the Cauer models 601, 602 may be in the form of any suitable computing device. The Cauer models 601, 602 are implemented in an iterative manner to provide estimated current and future thermal conditions of the chopper resistor 32 at defined time steps or intervals. The Cauer estimator 601 may operate at a defined frequency, e.g. 1 kHz. That is, in the case of 1 kHz operation, the inputs 603, 604, 605 are sampled 1000 times per second, with the Cauer model being executed or evaluated 1000 times each second, i.e. a time step of 0.001 seconds.

As mentioned above, the Cauer predictor 602 predicts the evolution of the surface temperature across a prescribed time period into the future, and the time (e.g. in seconds) it will take for the surface temperature to reach a prescribed value within the future time window, under the assumption that the wind turbine 10 is tripped at the present/current time, i.e. zero power loss across the chopper. The Cauer predictor 602 may operate at the same defined frequency as the Cauer estimator 601, e.g. 1 kHz.

In an illustrative example in which the Cauer estimator 601 and Cauer predictor 602 both run at 1 kHz, and it is desired to predict the evolution of the surface temperature 600 seconds into the future from the current time, then one option would be for the Cauer predictor 602 to be operated in a corresponding manner to the Cauer estimator 601 such that the Cauer predictor 602 would need to iterate 600000 times to obtain the surface temperature 600 seconds ahead. However, it may not be suitable to implement this relatively high number of iterations from a computational processing cost viewpoint.

As such, it may be preferable to have a sampling time/rate for the Cauer predictor 602 that is different from, and independent from, the Cauer estimator 601. In addition, it may be preferable to have a lower number of iterations—and perhaps a significantly lower number of iterations—to simulate the future time period in the Cauer predictor 602 than would be the case in the Cauer estimator 601. For instance, to simulate 600 seconds into the future, the Cauer predictor 602 may use tens of iterations, e.g. 10 to 50 iterations, rather than the 600000 iterations that would be used in the equivalent simulation in the Cauer estimator 601. This example splits the number of samples across real time to reduce the iteration time.

Therefore, instead of predicting the future thermal condition, e.g. future surface temperature, at intervals of 0.001 seconds, the future thermal condition is estimated at larger time intervals. In the present context, as there is a large thermal inertia (large time constant), the surface temperature of the chopper resistor 32 will continue to rise for a relatively long time period after operation of the wind turbine 10 is stopped. As such, predicting the future surface temperature at intervals greater than 0.001 seconds is sufficient to be able to take appropriate action to prevent chopper overheating. In fact, a prediction of future surface temperature at time intervals of the order of tenths of a second (e.g. every 0.1 to 1 seconds), or order of seconds (e.g. every 1 to 5 seconds), may be sufficient for this purpose.

In general, therefore, the controller 37 implements the method in an iterative manner, with the Cauer estimator 601 being executed at a first iteration rate to provide the determined at least one internal temperature at time intervals of a first interval length, e.g. at a rate of once every 0.001 seconds. Also, the Cauer predictor 602 is executed at a different (second) iteration rate to provide the predicted future thermal condition at time intervals of a second interval length. The second interval length may be greater than the first interval length, for instance at least one order of magnitude greater than the first interval length, e.g. the second interval length may be 0.1 seconds. That is, the second iteration rate may be greater than the first iteration rate. In an illustrative example, the second iteration rate may be 5-10 iterations every 0.001 seconds and the second interval length may be every 1-5 seconds.

Figure 5:
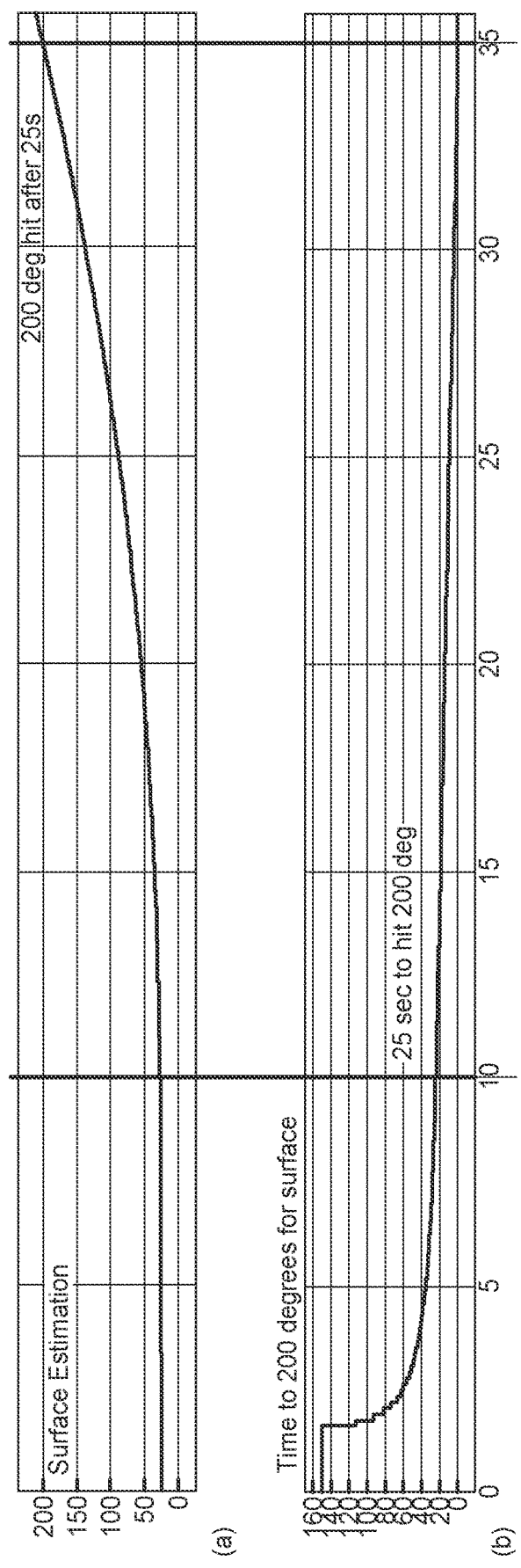
FIG. 5 shows results of a simulation executing the module architecture of FIG. 4: in particular.

FIG. 5 shows plots of the simulated outputs from the Cauer predictor 602 when the described method is implemented for extreme chopper heating. In particular, FIG. 5(a) shows a plot of estimated future surface temperature of the chopper resistor 32 across a future time period, and FIG. 5(b) shows a plot of the estimated time it will take for the surface temperature to reach a prescribed value—in this case, 200 degrees Celsius—across the future time period. As indicated in these figures, at t=10 seconds—i.e. ten seconds into the simulated future time period— FIG. 5(b) shows that the predicted amount of time it will take for the chopper surface temperature to reach 200 degrees Celsius is 25 seconds. That means that, in real time from the current time, it is predicted that the surface temperature will reach 200 degrees Celsius in 10+25=35 seconds. Referring to FIG. 5(a), it is shown that the predicted surface temperature does indeed reach 200 degrees Celsius at t=35 seconds.

The predictions of the future thermal condition of the chopper surface can therefore be used by the controller 37 so that a control action, e.g. turbine shut down, is taken ahead of the chopper surface reaching its maximum allowable temperature. In particular, the control action may be taken sufficiently early based on the predictions such that the chopper surface temperature does not exceed its maximum allowable temperature. For instance, if the thermal time constant of the surface temperature is 100 seconds, then the trip signal to shut down wind turbine operation should be sent when the predicted time for the surface temperature to reach 200 degrees Celsius is less than or equal to 100 seconds, where the thermal time constant is a measure of the time required for a thermistor to respond to a change in ambient temperature. In particular, a lower thermal time constant means a faster temperature response whereas a higher thermal time constant means that it takes longer for the temperature to change.

The above implementation may be achieved by iterating the Cauer predictor 602 less than once every 0.001 seconds (for a Cauer estimator running at 1 kHz), for instance every 0.1 seconds. Simulated time is then incremented each time the Cauer predictor 602 is incremented, with the Cauer predictor's sampling time. When the simulated time reaches the set or prescribed prediction time, e.g. 600 seconds, the Cauer predictor 602 outputs the future surface temperature and the time remaining until a prescribed surface temperature, e.g. 200 degrees Celsius, is reached. A control action may be taken based on the predicted outputs, if needed. The Cauer predictor 602 is then reinitialized with the internal temperature(s) received from the Cauer estimator 601, and the process is repeated.

Table 1 below outlines examples of how much real time is needed to predict surface temperature a prescribed amount of time in the future, for different prescribed times (TFuture), numbers of iterations (N), and predictor sampling time or step size (PTs). The simulated time increases by N*PTs every Ts of real time, where Ts is the (code or estimator) sampling time. The predictor therefore outputs a new prediction every TFuture/(N*PTs*f), where f=1/Ts is the (code or estimator) frequency (and f=1 kHz in the outlined examples). In the present context, it has been found by simulation that step sizes of the order of hundreds of times larger than the sampling time, e.g. up to 500 times larger, can produce very accurate results.

TABLE 1

| Prediction Time (TFuture) | Iterations (N) | Predictor Sampling (PTs) | Can Predict Every |
|---|---|---|---|
| 600 (10 minutes) | 10 | 0.1 | 0.6 seconds |
| 600 (10 minutes) | 50 | 0.1 | 0.12 seconds |
| 1800 (0.5 hours) | 10 | 0.1 | 1.8 seconds |
| 1800 (0.5 hours) | 50 | 0.01 | 3.6 seconds |

In summary, the Cauer predictor 602 has a different time step from the Cauer estimator 601, and the Cauer predictor 602 is iterated multiple times inside the 1 kHz (or other suitable value) scan function of the system. This allows the Cauer predictor 602 to simulate the future thermal behaviour, using its own time vector. For 10 iterations and a time step of 0.1, the Cauer predictor 602 can predict 300 seconds into the future in 0.3 (real) seconds. This means that every 0.3 seconds, the future thermal condition (e.g. future surface temperature) may again be predicted 300 seconds ahead.

Figure 6:
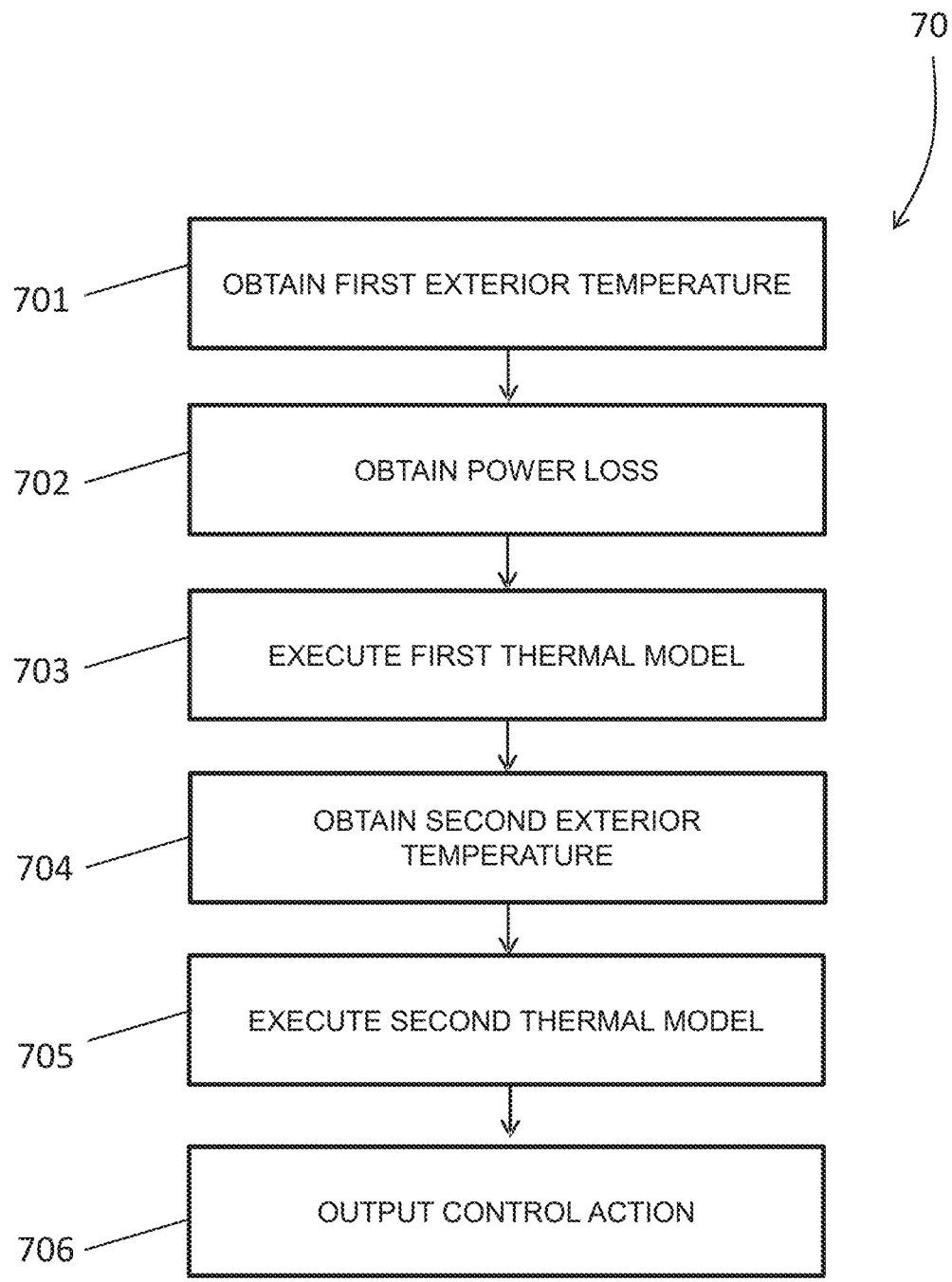

FIG. 6 summarises the steps of a method 70 performed by the controller 37 in accordance examples of the invention. At step 701, the method 70 involves obtaining a first exterior temperature associated with an electrical component, e.g. the chopper resistor 32. The first exterior temperature may include ambient temperature and a surface temperature of the chopper resistor 32, for instance.

At step 702, the method 70 involves obtaining a power loss of the electrical component at current operating variables. The current/present operating variables may include a duty cycle and a (DC) voltage, for instance. In a different example, the current operating variables may include a current across the load (component) and a (DC) voltage.

At step 703, the method 70 involves executing a first thermal model, e.g. a Cauer model, describing the electrical component to determine at least one internal temperature of the electrical component, e.g. a component wire temperature and/or one or more internal circuit temperatures of the component. The first thermal model is executed based on the obtained first exterior temperature and the obtained power loss.

At step 704, the method 70 involves obtaining a second exterior temperature associated with the electrical component. The second exterior temperature may be ambient temperature, for instance.

At step 705, the method 70 involves executing a second thermal model, e.g. a Cauer model, describing the electrical component to predict a future thermal condition of the electrical component. The second thermal model is executed based on the determined internal temperature and second exterior temperature. The future thermal condition may include one or both of a future surface temperature of the electrical component at a defined time ahead of a current time, and a predicted time until the surface temperature of the electrical component reaches a prescribed threshold temperature (within a specified or defined future period of time).

At step 705, the method 70 optionally involves outputting a control action for controlling operation of the wind turbine based on the future thermal condition. The control action may be to trip the wind turbine 10, or to change a current operational mode of the wind turbine, e.g. to derate turbine operation, or to overload the electrical component.

Many modifications may be made to the described examples without departing from the scope of the appended claims.

In the above-described examples, time-dependent thermal models in the form of Cauer models or functions are used to estimate current and future thermal conditions (e.g. electrical component surface temperature). In different examples, one or both of the thermal models used to estimate current thermal conditions and future thermal conditions may be a different type of suitable thermal model. For instance, a Foster model (as is known in the art) may be used. In one specific example, a Foster model may be used to estimate the present/current internal temperature(s) of the electrical component, and a Cauer model may then be used to predict the future thermal condition based on the outputs from the Foster model.

In the above-described examples, the (Cauer) predictor model assumes that a signal to trip the wind turbine is sent at the current time such that there is zero power loss across the electrical component under consideration. In different examples, the (Cauer) predictor model may assume that a different action is taken at the current time and predict the future thermal condition based on this assumption. For instance, it may be assumed that a signal to derate operation of the wind turbine has been sent, such that the predicted future thermal condition may be based on a non-zero power loss across the electrical component. Indeed, any suitable operational mode change may be considered with the described approach. In this regard, the control action that may be taken by the controller based on the output of the (Cauer) thermal predictor module and/or the (Cauer) thermal estimator module may be to change a current operational mode of the wind turbine. This can include tripping the wind turbine, or derating operation of the turbine. However, this could also include uprating operation of the turbine, e.g. if the future surface temperature of the electrical component is predicted to be lower—or below a certain value—then a signal to overload the component may be transmitted.

In the above-described examples, a system with two thermal (Cauer) models is described: a first model to determine a current internal temperature of the electrical component; and, a second model to predict a future thermal condition of the electrical component. In different examples, however, the system may include more than one first Cauer model and/or more than one second Cauer model. For instance, as the second Cauer model described above takes zero power loss as an input, then a separate second Cauer model may be needed if it is desired to calculate overload of the electrical component based on a defined power input or if it is desired to predict behaviour for a derated operation. In an example in which a prediction based on each zero power loss, a defined power input, and derated operation is required, there would therefore be one first Cauer model and three second Cauer models (one for each of zero power loss, a defined power input, and derated operation). It will be appreciated that any suitable number/combination of first and second Cauer models may be used as desired, i.e. one or more first Cauer models and one or more second Cauer models.

The above-described examples describe predicting a future thermal condition of the surface of the electrical component under consideration; however, it will be understood that the future thermal condition of a different part associated with the electrical component may instead, or additionally, be made, e.g. a future thermal condition of one or more internal layers, e.g. resistive element, of the component. Although the above-described examples relate to estimating the thermal condition of a chopper resistor, it will be understood that the described approach may be implemented for any other suitable electrical component of a wind turbine.

The invention claimed is:

1. A method of monitoring a wind turbine having an electrical component, the method comprising:
   obtaining a first exterior temperature associated with the electrical component;
   obtaining a power loss of the electrical component at current operating variables;
   executing a first thermal model describing the electrical component to determine at least one internal temperature of the electrical component, the first thermal model being executed based on the obtained first exterior temperature and the obtained power loss;
   obtaining a second exterior temperature associated with the electrical component; and
   executing a second thermal model describing the electrical component to predict a future thermal condition of the electrical component to monitor operation of the wind turbine, the second thermal model being executed based on the determined at least one internal temperature and the obtained second exterior temperature; and
   based on the future thermal condition, shutting down the wind turbine or switching the wind turbine to a different operational mode, wherein the different operational mode comprises at least one of (i) a derated operational mode or (ii) an operational mode to overload the electrical component.

2. The method of claim 1, wherein the second thermal model is executed based on zero power loss of the electrical component.

3. The method of claim 1, wherein at least one computing device implements the method in an iterative manner, wherein the first thermal model is executed at a first iteration rate to provide the determined at least one internal temperature at time intervals of a first interval length, wherein the second thermal model is executed at a second iteration rate to provide the predicted future thermal condition at time intervals of a second interval length, wherein the second interval length is greater than the first interval length.

4. The method of claim 3, wherein the second iteration rate is greater than the first iteration rate.

5. The method of claim 1, wherein the electrical component includes a chopper resistor of a power converter of the wind turbine.

6. The method of claim 1, wherein the at least one internal temperature includes a temperature of a resistive element of the electrical component.

7. The method of claim 1, wherein the at least one internal temperature includes one or more internal circuit temperatures of the electrical component.

8. The method of claim 1, wherein the future thermal condition includes a future surface temperature of the electrical component at a defined time ahead of a current time.

9. The method of claim 1, wherein the future thermal condition includes a predicted time until a surface temperature of the electrical component reaches a prescribed threshold temperature within a defined future period of time.

10. The method of claim 1, wherein the first thermal model is a first Cauer model and/or the second thermal model is a second Cauer model.

11. The method of claim 1, wherein the first exterior temperature is one of: ambient temperature; and, a surface temperature of the electrical component.

12. The method of claim 1, wherein the second exterior temperature is ambient temperature.

13. A controller for controlling a wind turbine having an electrical component, the controller being configured to:
   obtain a first exterior temperature associated with the electrical component;
   obtain a power loss of the electrical component at current operating variables;
   execute a first thermal model describing the electrical component to determine at least one internal temperature of the electrical component, the first thermal model being executed based on the obtained first exterior temperature and the obtained power loss;
   obtain a second exterior temperature associated with the electrical component;
   execute a second thermal model describing the electrical component to predict a future thermal condition of the electrical component, the second thermal model being executed based on the determined at least one internal temperature and the obtained second exterior temperature; and
   output a control action for controlling operation of the wind turbine based on the future thermal condition.

14. The controller of claim 13, wherein the second thermal model is executed based on zero power loss of the electrical component.

15. The controller of claim 13, wherein the controller works in an iterative manner, wherein the first thermal model is executed at a first iteration rate to provide the determined at least one internal temperature at time intervals of a first interval length, wherein the second thermal model is executed at a second iteration rate to provide the predicted future thermal condition at time intervals of a second interval length, wherein the second interval length is greater than the first interval length.

16. The controller of claim 15, wherein the second iteration rate is greater than the first iteration rate.

17. The controller of claim 13, wherein the control action includes at least one of causing:
   operation of the wind turbine to shut down; and
   the wind turbine to switch to a different operational mode, wherein the different operational mode comprises at least one of (i) a derated operational mode or (ii) an operational mode to overload the electrical component.

18. The controller of claim 13, wherein the electrical component includes a chopper resistor of a power converter of the wind turbine.

19. The controller of claim 13, wherein the at least one internal temperature includes a temperature of a resistive element of the electrical component.

20. A wind turbine, comprising:
   a tower;
   a nacelle disposed on the tower;
   an electrical component; and
   a controller configured to:
      obtain a first exterior temperature associated with the electrical component;
      obtain a power loss of the electrical component at current operating variables;
      execute a first thermal model describing the electrical component to determine at least one internal temperature of the electrical component, the first thermal model being executed based on the obtained first exterior temperature and the obtained power loss;
      obtain a second exterior temperature associated with the electrical component;
      execute a second thermal model describing the electrical component to predict a future thermal condition of the electrical component, the second thermal model being executed based on the determined at least one internal temperature and the obtained second exterior temperature; and
      output a control action for controlling operation of the wind turbine based on the future thermal condition.

\* \* \* \* \*